(12) United States Patent
Usoro et al.

(10) Patent No.: US 6,743,145 B2
(45) Date of Patent: Jun. 1, 2004

(54) PLANETARY TRANSMISSIONS WITH THREE INTERCONNECTED GEAR SETS AND A STATIONARY MEMBER

(75) Inventors: Patrick Benedict Usoro, Troy, MI (US); Madhusudan Raghavan, West Bloomfield, MI (US); Norman Kenneth Bucknor, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/243,859

(22) Filed: Sep. 13, 2002

(65) Prior Publication Data

US 2004/0053732 A1 Mar. 18, 2004

(51) Int. Cl.$^7$ ................................................ F16H 3/62
(52) U.S. Cl. ..................... 475/286; 475/296; 475/314; 475/320; 475/326
(58) Field of Search ................................ 475/275, 280, 475/282, 284, 286, 296, 314, 320, 326, 330

(56) References Cited

U.S. PATENT DOCUMENTS

| | | | |
|---|---|---|---|
| 4,004,473 A | * 1/1977 | Pearce et al. | 475/276 X |
| 4,070,927 A | 1/1978 | Polak | 74/765 |
| 4,709,594 A | 12/1987 | Maeda | 74/753 |
| 5,106,352 A | 4/1992 | Lepelletier | 475/280 |
| 5,599,251 A | 2/1997 | Beim et al. | 475/275 |
| 5,879,263 A | * 3/1999 | Haka | 475/276 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,425,841 B1 | * 7/2002 | Haka | 475/286 X |

FOREIGN PATENT DOCUMENTS

| JP | 402154846 | * 6/1990 | 475/276 |
|---|---|---|---|
| JP | 9-126283 | 5/1997 | |

* cited by examiner

*Primary Examiner*—Ha Ho
(74) *Attorney, Agent, or Firm*—Kathryn A. Marra

(57) ABSTRACT

The family of transmissions has a plurality of members that can be utilized in powertrains to provide at least seven forward speed ratios and at least one reverse speed ratio. The transmission family members include three planetary gear sets having six torque-transmitting mechanisms and a fixed interconnection. Also, one planetary gear member is continuously connected with the transmission housing. The powertrain includes an engine and torque converter that is not continuously connected with any of the planetary gear members and an output member that is continuously connected with one of the planetary gear members. The six torque-transmitting mechanisms provide interconnections between various gear members, the input shaft, the output shaft, and with the transmission housing, and are operated in combinations of three to establish at least seven forward speed ratios and one reverse speed ratio.

14 Claims, 9 Drawing Sheets

| | RATIOS | 50 | 52 | 54 | 56 | 58 | 59 |
|---|---|---|---|---|---|---|---|
| REVERSE 2 | -6.61 | | X | | | X | X |
| REVERSE 1 | -2 | X | | | | X | X |
| NEUTRAL | 0 | | | | X | X | |
| 1 | 3.89 | | X | | X | X | |
| 2 | 2.14 | X | | | X | X | |
| 3 | 1.38 | | | X | X | X | |
| 4 | 1 | X | | X | X | | |
| 5 | 0.82 | | X | X | X | | |
| 6 | 0.74 | | X | X | | | X |
| 7 | 0.67 | | | X | X | | X |

(X = ENGAGED CLUTCH)

$\dfrac{\text{RING GEAR}}{\text{SUN GEAR}}$ TOOTH RATIO: $\dfrac{R_1}{S_1} = 1.82$, $\dfrac{R_2}{S_2} = 2.31$, $\dfrac{R_3}{S_3} = 2.00$

| RATIO SPREAD | 5.83 |
|---|---|
| RATIO STEPS | |
| REV/1 | -0.51 |
| 1/2 | 1.82 |
| 2/3 | 1.55 |
| 3/4 | 1.38 |
| 4/5 | 1.22 |
| 5/6 | 1.1 |
| 6/7 | 1.11 |

|  | RATIOS | 150 | 152 | 154 | 156 | 158 | 159 |
|---|---|---|---|---|---|---|---|
| REVERSE 2 | -4.97 |  | X |  |  | X | X |
| REVERSE 1 | -1.89 | X |  |  |  | X | X |
| NEUTRAL | 0 |  |  |  | X | X |  |
| 1 | 3.74 |  | X |  | X | X |  |
| 2 | 2.32 | X |  |  | X | X |  |
| 3 | 1.46 |  |  | X | X | X |  |
| 4 | 1 | X |  | X | X |  |  |
| 5 | 0.83 |  | X | X | X |  |  |
| 6 | 0.75 |  | X | X |  |  | X |
| 7 | 0.65 |  |  | X | X |  | X |

(X = ENGAGED CLUTCH)

$\frac{\text{RING GEAR}}{\text{SUN GEAR}}$ TOOTH RATIO: $\frac{R_1}{S_1} = 1.63$, $\frac{R_2}{S_2} = 1.65$, $\frac{R_3}{S_3} = 1.88$

| RATIO SPREAD | 5.72 |
|---|---|
| RATIO STEPS |  |
| REV/1 | -0.5 |
| 1/2 | 1.61 |
| 2/3 | 1.59 |
| 3/4 | 1.46 |
| 4/5 | 1.2 |
| 5/6 | 1.11 |
| 6/7 | 1.15 |

| | RATIOS | 250 | 252 | 254 | 256 | 258 | 259 |
|---|---|---|---|---|---|---|---|
| REVERSE | -4.32 | | X | X | | | X |
| NEUTRAL | 0 | | X | | | | X |
| 1 | 4.53 | | X | | X | | X |
| 2 | 2.41 | | X | | X | X | |
| 3 | 1.62 | | X | X | X | | |
| 4 | 1 | X | X | | X | | |
| 5 | 0.83 | X | | X | X | | |
| 6 | 0.7 | X | X | X | | | |
| 7 | 0.6 | X | X | | | X | |

(X = ENGAGED CLUTCH)

$\frac{\text{RING GEAR}}{\text{SUN GEAR}}$ TOOTH RATIO: $\frac{R_1}{S_1} = 1.87$, $\frac{R_2}{S_2} = 1.51$, $\frac{R_3}{S_3} = 3.00$

| RATIO SPREAD | 7.54 |
|---|---|
| RATIO STEPS | |
| REV/1 | -0.95 |
| 1/2 | 1.88 |
| 2/3 | 1.49 |
| 3/4 | 1.62 |
| 4/5 | 1.21 |
| 5/6 | 1.18 |
| 6/7 | 1.16 |

| | RATIOS | 350 | 352 | 354 | 356 | 358 | 359 |
|---|---|---|---|---|---|---|---|
| REVERSE | -4.32 | | X | | X | | X |
| NEUTRAL | 0 | | X | | | | X |
| 1 | 4.53 | | X | | | X | X |
| 2 | 2.41 | | X | X | | X | |
| 3 | 1.62 | | X | | X | X | |
| 4 | 1 | X | X | | | X | |
| 5 | 0.83 | X | | | X | X | |
| 6 | 0.7 | X | | X | X | | |
| 7 | 0.6 | X | X | X | | | |

(X = ENGAGED CLUTCH)

$\dfrac{\text{RING GEAR}}{\text{SUN GEAR}}$ TOOTH RATIO: $\dfrac{R_1}{S_1} = 1.87$, $\dfrac{R_2}{S_2} = 1.51$, $\dfrac{R_3}{S_3} = 3.00$

| RATIO SPREAD | 7.54 |
|---|---|
| RATIO STEPS | |
| REV/1 | -0.95 |
| 1/2 | 1.88 |
| 2/3 | 1.49 |
| 3/4 | 1.62 |
| 4/5 | 1.21 |
| 5/6 | 1.18 |
| 6/7 | 1.16 |

| | RATIOS | 450 | 452 | 454 | 456 | 458 | 459 |
|---|---|---|---|---|---|---|---|
| REVERSE | -4.15 | | X | X | | | X |
| NEUTRAL | 0 | | X | | | | X |
| 1 | 4.53 | | X | | X | | X |
| 2 | 2.41 | | X | | X | X | |
| 3 | 1.59 | | X | X | X | | |
| 4 | 1 | X | X | | X | | |
| 5 | 0.83 | X | | | X | X | |
| 6 | 0.7 | X | X | X | | | |
| 7 | 0.6 | X | X | | | X | |

(X = ENGAGED CLUTCH)

$\frac{\text{RING GEAR}}{\text{SUN GEAR}}$ TOOTH RATIO: $\frac{R_1}{S_1} = 2.28$, $\frac{R_2}{S_2} = 1.51$, $\frac{R_3}{S_3} = 3.00$

| RATIO SPREAD | 7.54 |
|---|---|
| RATIO STEPS | |
| REV/1 | -0.92 |
| 1/2 | 1.88 |
| 2/3 | 1.51 |
| 3/4 | 1.59 |
| 4/5 | 1.2 |
| 5/6 | 1.18 |
| 6/7 | 1.17 |

| | RATIOS | 550 | 552 | 554 | 556 | 558 | 559 |
|---|---|---|---|---|---|---|---|
| REVERSE | -4.15 | | X | | X | | X |
| NEUTRAL | 0 | | X | | | | X |
| 1 | 4.53 | | X | | | X | X |
| 2 | 2.41 | | X | X | | X | |
| 3 | 1.59 | | X | | X | X | |
| 4 | 1 | X | X | | | X | |
| 5 | 0.83 | X | | | X | X | |
| 6 | 0.7 | X | X | | X | | |
| 7 | 0.6 | X | X | X | | | |

(X = ENGAGED CLUTCH)

$\dfrac{\text{RING GEAR}}{\text{SUN GEAR}}$ TOOTH RATIO: $\dfrac{R_1}{S_1} = 2.28$, $\dfrac{R_2}{S_2} = 1.51$, $\dfrac{R_3}{S_3} = 3.00$

| RATIO SPREAD | 7.54 |
|---|---|
| RATIO STEPS | |
| REV/1 | -0.92 |
| 1/2 | 1.88 |
| 2/3 | 1.51 |
| 3/4 | 1.59 |
| 4/5 | 1.2 |
| 5/6 | 1.18 |
| 6/7 | 1.17 |

| | RATIOS | 650 | 652 | 654 | 656 | 658 | 659 |
|---|---|---|---|---|---|---|---|
| REVERSE | -3.98 | X | | | X | | X |
| NEUTRAL | 0 | X | | | | | X |
| 1 | 6.01 | X | | | | X | X |
| 2 | 4.01 | X | | X | | | X |
| 3 | 2.74 | X | | X | | X | |
| 4 | 1.77 | X | | X | X | | |
| 5 | 1.36 | X | X | X | | | |
| 6 | 1.15 | | X | X | X | | |
| 7 | 1 | | X | | X | X | |
| 8 | 0.65 | | X | X | | X | |

(X = ENGAGED CLUTCH)

$\frac{\text{RING GEAR}}{\text{SUN GEAR}}$ TOOTH RATIO: $\frac{R_1}{S_1} = 1.82, \frac{R_2}{S_2} = 3.00, \frac{R_3}{S_3} = 1.50$

| RATIO SPREAD | 9.25 |
|---|---|
| RATIO STEPS | |
| REV/1 | -0.66 |
| 1/2 | 1.5 |
| 2/3 | 1.46 |
| 3/4 | 1.55 |
| 4/5 | 1.3 |
| 5/6 | 1.18 |
| 6/7 | 1.15 |
| 7/8 | 1.54 |

| RATIOS | | 750 | 752 | 754 | 756 | 758 | 759 |
|---|---|---|---|---|---|---|---|
| REVERSE | -0.96 | | | X | X | | X |
| NEUTRAL | 0 | | | X | | | X |
| 1 | 1.44 | X | | X | | | X |
| 2 | 1 | X | | X | | X | |
| 3 | 0.7 | | | X | | X | X |
| 4 | 0.46 | | X | X | | X | |
| 5 | 0.36 | | X | X | | | X |
| 6 | 0.29 | | X | X | X | | |
| 7 | 0.25 | | X | | X | X | |

(X = ENGAGED CLUTCH)

$\frac{\text{RING GEAR}}{\text{SUN GEAR}}$ TOOTH RATIO: $\frac{R_1}{S_1} = 3.00$, $\frac{R_2}{S_2} = 1.51$, $\frac{R_3}{S_3} = 2.25$

| RATIO SPREAD | 5.78 |
|---|---|
| RATIO STEPS | |
| REV/1 | -0.66 |
| 1/2 | 1.44 |
| 2/3 | 1.42 |
| 3/4 | 1.55 |
| 4/5 | 1.26 |
| 5/6 | 1.24 |
| 6/7 | 1.16 |

| RATIOS | | 850 | 852 | 854 | 856 | 858 | 859 |
|---|---|---|---|---|---|---|---|
| REVERSE | -0.96 | | X | | X | | X |
| NEUTRAL | 0 | | X | | | | X |
| 1 | 1.44 | | X | X | | | X |
| 2 | 1 | | X | X | | X | |
| 3 | 0.7 | | X | | | X | X |
| 4 | 0.46 | X | X | | | X | |
| 5 | 0.36 | X | X | | | | X |
| 6 | 0.29 | X | X | | X | | |
| 7 | 0.25 | X | | | X | X | |

(X = ENGAGED CLUTCH)

$\dfrac{\text{RING GEAR}}{\text{SUN GEAR}}$ TOOTH RATIO: $\dfrac{R_1}{S_1} = 3.00$, $\dfrac{R_2}{S_2} = 2.51$, $\dfrac{R_3}{S_3} = 2.25$

| RATIO SPREAD | 5.78 |
|---|---|
| RATIO STEPS | |
| REV/1 | -0.66 |
| 1/2 | 1.44 |
| 2/3 | 1.42 |
| 3/4 | 1.55 |
| 4/5 | 1.26 |
| 5/6 | 1.24 |
| 6/7 | 1.16 |

PLANETARY TRANSMISSIONS WITH THREE INTERCONNECTED GEAR SETS AND A STATIONARY MEMBER

TECHNICAL FIELD

The present invention relates to a family of power transmissions having three planetary gear sets that are controlled by six torque-transmitting devices to provide at least seven forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; and U.S. Pat. No. 5,599,251 issued to Beim and McCarrick on Feb. 4, 1997.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions. The Polak transmission provides six forward speed ratios with three planetary gear sets, two clutches, and three brakes. The Koivunen and Beim patents utilize six torque-transmitting devices including four brakes and two clutches to establish six forward speed ratios and a reverse ratio. The Lepelletier patent employs three planetary gear sets, three clutches and two brakes to provide six forward speeds. One of the planetary gear sets is positioned and operated to establish two fixed speed input members for the remaining two planetary gear sets.

Seven-speed transmissions are disclosed in U.S. Pat. Nos. 4,709,594 to Maeda; 6,053,839 to Baldwin et. al.; and 6,083,135 to Baldwin et. al. Seven- and eight-speed transmissions provide further improvements in acceleration and fuel economy over six-speed transmissions. However, like the six-speed transmissions discussed above, the development of seven- and eight-speed transmissions has been precluded because of complexity, size and cost.

SUMMARY OF THE INVENTION

It is an object of the present invention to provide an improved family of transmissions having three planetary gear sets controlled to provide at least seven forward speed ratios and one reverse speed ratio.

In one aspect of the present invention, the family of transmissions has three planetary gear sets, each of which includes a first, second and third member, which members may comprise a sun gear, a ring gear, or a planet carrier assembly member.

In referring to the first, second and third gear sets in this description and in the claims, these sets may be counted "first" to "third" in any order in the drawings (i.e., left to right, right to left, etc.).

In another aspect of the present invention, each of the planetary gear sets may be of the single pinion-type or of the double pinion-type.

In yet another aspect of the present invention, the first member of the first planetary gear set is continuously interconnected with the first member of the second planetary gear set and the first member of the third planetary gear set through an interconnecting member.

In yet another aspect of the present invention, the second member of the first planetary gear set is continuously interconnected with a stationary member (transmission housing).

In yet a further aspect of the invention, each family member incorporates an output shaft which is continuously connected with at least one member of the planetary gear sets and an input shaft which is not continuously connected with any member of the planetary gear sets.

In a further aspect of the invention, a first torque-transmitting mechanism, such as a clutch, selectively interconnects the input shaft with a member of the first, second or third planetary gear set.

In still a further aspect of the invention, a second torque-transmitting mechanism, such as a clutch, selectively interconnects the input shaft with a member of the first, second or third planetary gear set, or with the interconnecting member.

In another aspect of the invention, a third torque-transmitting mechanism, such as a clutch, selectively interconnects a member of the first, second or third planetary gear set with the input shaft, or another member of the first, second or third planetary gear set.

In still another aspect of the invention, a fourth torque-transmitting mechanism, such as a clutch, selectively interconnects a member of the first, second or third planetary gear set or the interconnecting member with another member of the first, second or third planetary gear set.

In a still further aspect of the invention, a fifth torque-transmitting mechanism, such as a clutch, selectively interconnects a member of the first, second or third planetary gear set with another member of the first, second or third planetary gear set. Alternatively, a fifth torque-transmitting mechanism, such as a brake, selectively interconnects a member of the first, second or third planetary gear set with the stationary member.

In a further aspect of the invention, a sixth torque-transmitting mechanism, such as a clutch, selectively interconnects a member of the first, second or third planetary gear set with another member of the first, second or third planetary gear set. Alternatively, a sixth torque-transmitting mechanism, such as a brake, selectively interconnects a member of the first, second or third planetary gear set with the stationary member.

In still another aspect of the invention, the six torque-transmitting mechanisms are selectively engageable in combinations of three to yield at least seven forward speed ratios and one reverse speed ratio.

The above object and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart depicting some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention;

FIG. 6b is a truth table and chart depicting some of the operating characteristics of the powertrain shown in FIG. 6a;

FIG. 7a is a schematic representation of a powertrain having a planetary transmission incorporating another family member of the present invention;

FIG. 7b is a truth table and chart depicting some of the operating characteristics of the powertrain shown in FIG. 7a;

FIG. 8a is a schematic representation of a powertrain having a planetary transmission incorporating another family member of the present invention;

FIG. 8b is a truth table and chart depicting some of the operating characteristics of the powertrain shown in FIG. 8a;

FIG. 9a is a schematic representation of a powertrain having a planetary transmission incorporating another family member of the present invention; and FIG. 9b is a truth table and chart depicting some of the operating characteristics of the powertrain shown in FIG. 9a.

DESCRIPTION OF THE PREFERRED EMBODIMENTS

Figures 1A, 1B:
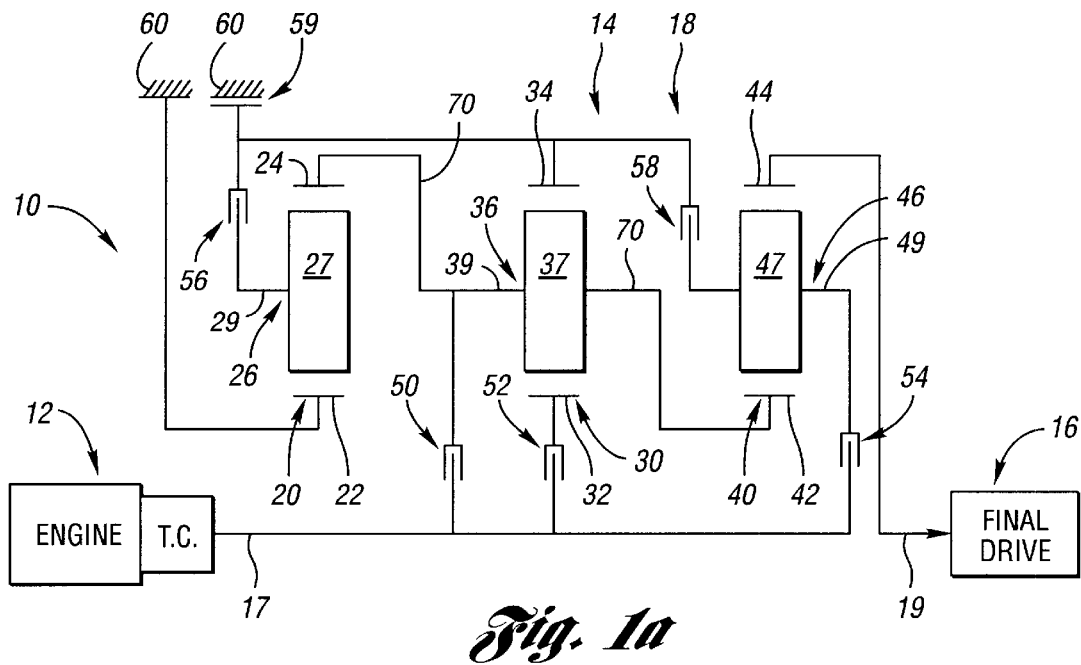

Referring to the drawings, wherein like characters represent the same or corresponding parts throughout the several views, there is shown in FIG. 1a a powertrain 10 having a conventional engine and torque converter 12, a planetary transmission 14, and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly 26. The planet carrier assembly 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of pinion gears 47 rotatably mounted on a carrier member 49 and disposed in meshing relationship with both the sun gear member 42 and the ring gear member 44.

The planetary gear arrangement also includes six torque-transmitting mechanisms 50, 52, 54, 56, 58 and 59. The torque-transmitting mechanisms 50, 52, 54, 56 and 58 are rotating-type torque-transmitting mechanisms, commonly termed clutches. The torque-transmitting mechanism 59 is a stationary-type torque-transmitting mechanism, commonly termed brake or reaction clutch.

The input shaft 17 is not continuously connected with any planetary gear member. The output shaft 19 is continuously connected with the ring gear member 44. The sun gear member 22 is continuously connected with the transmission housing 60. The ring gear member 24 is continuously connected with the planet carrier assembly member 36 and with the sun gear member 42 through the interconnecting member 70.

The planet carrier assembly member 36 is selectively connectable with the input shaft 17 through the clutch 50. The sun gear member 32 is selectively connectable with the input shaft 17 through the clutch 52. The planet carrier assembly member 46 is selectively connectable with the input shaft 17 through the clutch 54. The planet carrier assembly member 26 is selectively connectable with the ring gear member 34 through the clutch 56. The ring gear member 34 is selectively connectable with the planet carrier assembly member 46 through the clutch 58. The ring gear member 34 is selectively connectable with the transmission housing 60 through the brake 59.

As shown in FIG. 1b, and in particular the truth table disclosed therein, the torque-transmitting mechanisms are selectively engaged in combinations of three to provide seven forward speed ratios and two reverse speed ratios. It should also be noted in the truth table that the torque-transmitting mechanisms 56 and 58 are engaged through the neutral condition, thereby simplifying the forward/reverse interchange.

The reverse speed ratio (Reverse 1) is established with the engagement of the clutches 50, 58 and the brake 59. The clutch 50 connects the planet carrier assembly member 36 with the input shaft 17. The clutch 58 connects the ring gear member 34 with the planet carrier assembly member 46. The brake 59 connects the ring gear member 34 with the transmission housing 60. The sun gear member 22 does not rotate. The ring gear member 24, planet carrier assembly member 36, and sun gear member 42 rotate at the same speed as the input shaft 17. The ring gear member 34 and planet carrier assembly member 46 do not rotate. The ring gear member 44 rotates at the same speed as the output shaft 19. The ring gear member 44, and therefore the output shaft 19, rotates at a speed determined from the speed of the sun gear member 42 and the ring gear/sun gear tooth ratio of the planetary gear set 40. The numerical value of the reverse speed ratio is determined utilizing the ring gear/sun gear tooth ratio of the planetary gear set 40.

The first forward speed ratio is established with the engagement of the clutches 52, 56 and 58. The clutch 52 connects the sun gear member 32 with the input shaft 17. The clutch 56 connects the planet carrier assembly member 26 with the ring gear member 34. The clutch 58 connects the ring gear member 34 with the planet carrier assembly member 46. The sun gear member 22 does not rotate. The planet carrier assembly member 26 rotates at the same speed as the ring gear member 34 and the planet carrier assembly member 46. The ring gear member 24 rotates at the same speed as the planet carrier assembly member 36 and the sun gear member 42. The planet carrier assembly member 26 rotates at a speed determined from the speed of the ring gear member 24 and the ring gear/sun gear tooth ratio of the planetary gear set 20. The planet carrier assembly member 36 rotates at a speed determined from the speed of the ring gear member 34, the speed of the sun gear member 32 and the ring gear/sun gear tooth ratio of the planetary gear set 30. The ring gear member 44 rotates at the same speed as the output shaft 19. The ring gear member 44, and therefore the output shaft 19, rotates at a speed determined from the speed of the planet carrier assembly member 46, the speed of the sun gear member 42 and the ring gear/sun gear tooth ratio of the planetary gear set 40. The numerical value of the first forward speed ratio is determined utilizing the ring gear/sun gear tooth ratios of the planetary gear sets 20, 30 and 40.

The second forward speed ratio is established with the engagement of the clutches 50, 56 and 58. The clutch 50 connects the planet carrier assembly member 36 with the input shaft 17. The clutch 56 connects the planet carrier assembly member 26 with the ring gear member 34. The clutch 58 connects the ring gear member 34 with the planet carrier assembly member 46. The planet carrier assembly member 26 rotates at the same speed as the ring gear member 34 and the planet carrier assembly member 46. The ring gear member 24, the planet carrier assembly member 36 and the sun gear member 42 rotate at the same speed as the input shaft 17. The sun gear member 22 does not rotate. The planet carrier assembly member 26 rotates at a speed determined from the speed of the ring gear member 24 and the ring gear/sun gear tooth ratio of the planetary gear set 20. The ring gear member 44 rotates at the same speed as the output shaft 19. The ring gear member 44, and therefore the output shaft 19, rotates at a speed determined from the speed of the planet carrier assembly member 46, the speed of the sun gear member 42 and the ring gear/sun gear tooth ratio of the planetary gear set 40. The numerical value of the second forward speed ratio is determined utilizing the ring gear/sun gear tooth ratios of the planetary gear sets 20 and 40.

The third forward speed ratio is established with the engagement of the clutches 54, 56 and 58. The clutch 54 connects the planet carrier assembly member 46 with the input shaft 17. The clutch 56 connects the planet carrier assembly member 26 with the ring gear member 34. The clutch 58 connects the ring gear member 34 with the planet carrier assembly member 46. The sun gear member 22 does not rotate. The planet carrier assembly member 26, the ring gear member 34 and the planet carrier assembly member 46 rotate at the same speed as the input shaft 17. The ring gear member 24 rotates at the same speed as the planet carrier assembly member 36 and the sun gear member 42. The planet carrier assembly member 26 rotates at a speed determined from the speed of the ring gear member 24 and the ring gear/sun gear tooth ratio of the planetary gear set 20. The ring gear member 44 rotates at the same speed as the output shaft 19. The ring gear member 44, and therefore the output shaft 19, rotates at a speed determined from the speed of the planet carrier assembly member 46, the speed of the sun gear member 42 and the ring gear/sun gear tooth ratio of the planetary gear set 40. The numerical value of the third forward speed ratio is determined utilizing the ring gear/sun gear tooth ratios of the planetary gear sets 20 and 40.

The fourth forward speed ratio is established with the engagement of the clutches 50, 54 and 56. In this configuration, the input shaft 17 is directly connected to the output shaft 19. The numerical value of the fourth forward speed ratio is 1.

The fifth forward speed ratio is established with the engagement of the clutches 52, 54 and 56. The clutch 52 connects the sun gear member 32 with the input shaft 17. The clutch 54 connects the planet carrier assembly member 46 with the input shaft 17. The clutch 56 connects the planet carrier assembly member 26 with the ring gear member 34. The sun gear member 22 does not rotate. The planet carrier assembly member 26 rotates at the same speed as the ring gear member 34. The ring gear member 24 rotates at the same speed as the planet carrier assembly member 36 and the sun gear member 42. The planet carrier assembly member 26 rotates at a speed determined from the speed of the ring gear member 24 and the ring gear/sun gear tooth ratio of the planetary gear set 20. The planet carrier assembly member 36 rotates at a speed determined from the speed of the ring gear member 34, the speed of the sun gear member 32 and the ring gear/sun gear tooth ratio of the planetary gear set 30. The ring gear member 44 rotates at the same speed as the output shaft 19. The ring gear member 44, and therefore the output shaft 19, rotates at a speed determined from the speed of the planet carrier assembly member 46, the speed of the sun gear member 42 and the ring gear/sun gear tooth ratio of the planetary gear set 40. The numerical value of the fifth forward speed ratio is determined utilizing the ring gear/sun gear tooth ratios of the planetary gear sets 20, 30 and 40.

The sixth forward speed ratio is established with the engagement of the clutches 52, 54 and the brake 59. The clutch 52 connects the sun gear member 32 with the input shaft 17. The clutch 54 connects the planet carrier assembly member 46 with the input shaft 17. The brake 59 connects the ring gear member 34 with the transmission housing 60. The sun gear member 22 does not rotate. The ring gear member 24 rotates at the same speed as the planet carrier assembly member 36 and the ring gear member 42. The ring gear member 34 does not rotate. The sun gear member 32 and planet carrier assembly member 46 rotate at the same speed as the input shaft 17. The planet carrier assembly member 36 rotates at a speed determined from the speed of the sun gear member 32 and the ring gear/sun gear tooth ratio of the planetary gear set 30. The ring gear member 44 rotates at the same speed as the output shaft 19. The ring gear member 44, and therefore the output shaft 19, rotates at a speed determined from the speed of the planet carrier assembly member 46, the speed of the sun gear member 42 and the ring gear/sun gear tooth ratio of the planetary gear set 40. The numerical value of the sixth forward speed ratio is determined utilizing the ring gear/sun gear tooth ratios of the planetary gear sets 30 and 40.

The seventh forward speed ratio is established with the engagement of the clutches 54, 56 and the brake 59. The clutch 54 connects the planet carrier assembly member 46 with the input shaft 17. The clutch 56 connects the planet carrier assembly member 26 with the ring gear member 34. The brake 59 connects the ring gear member 34 with the transmission housing 60. The planetary gear sets 20, 30 and the sun gear member 42 do not rotate. The planet carrier assembly member 46 rotates at the same speed as the input shaft 17. The ring gear member 44 rotates at the same speed as the output shaft 19. The ring gear member 44, and therefore the output shaft 19, rotates at a speed determined from the speed of the planet carrier assembly member 46 and the ring gear/sun gear tooth ratio of the planetary gear set 40. The numerical value of the seventh forward speed ratio is determined utilizing the ring gear/sun gear tooth ratio of the planetary gear set 40.

As set forth above, the engagement schedule for the torque-transmitting mechanisms is shown in the truth table of FIG. 1b. This truth table also provides an example of speed ratios that are available utilizing the ring gear/sun gear tooth ratios given by way of example in FIG. 1b. The R1/S1 value is the tooth ratio of the planetary gear set 20; the R2/S2 value is the tooth ratio of the planetary gear set 30; and the R3/S3 value is the tooth ratio of the planetary gear set 40. Also, the chart of FIG. 1b describes the ratio steps that are attained utilizing the sample of tooth ratios given. For example, the step ratio between the first and second forward speed ratios is 1.82, while the step ratio between the reverse/1 and first forward ratio is −0.51.

Figures 2A, 2B:
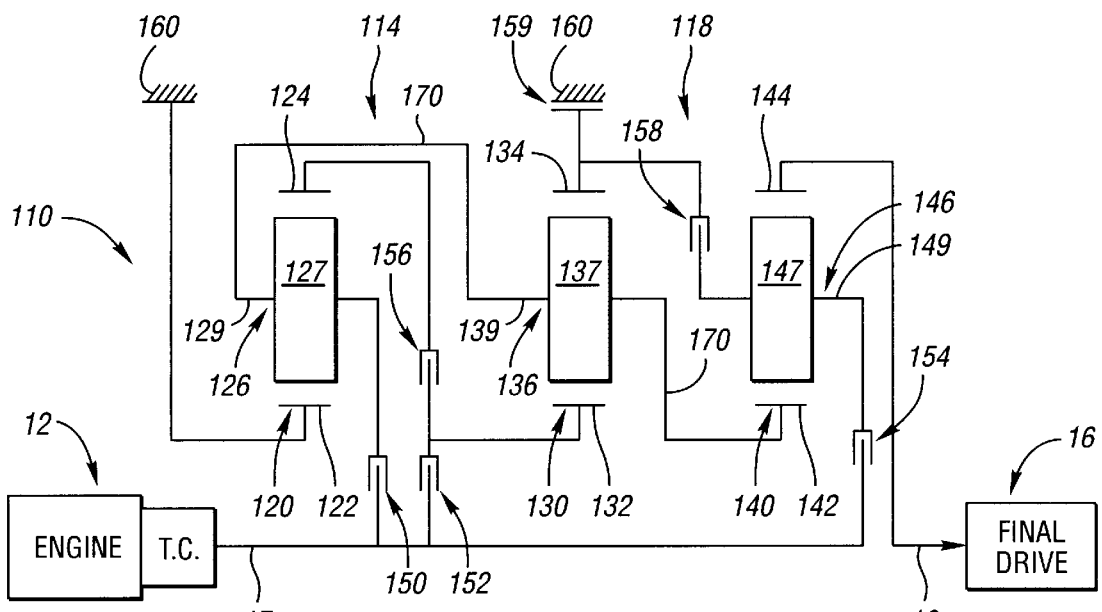

FIG. 2a shows a powertrain 110 having a conventional engine and torque converter 12, a planetary transmission 114, and a conventional final drive mechanism 16.

The planetary transmission 114 includes an input shaft 17 continuously connected with the engine and torque converter 12, a planetary gear arrangement 118, and an output shaft 19 continuously connected with the final drive mechanism 16. The planetary gear arrangement 118 includes three planetary gear sets 120, 130 and 140.

The planetary gear set 120 includes a sun gear member 122, a ring gear member 124, and a planet carrier assembly member 126. The planet carrier assembly 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of pinion gears 137 rotatably mounted on a carrier member 139 and disposed in meshing relationship with both the sun gear member 132 and the ring gear member 134.

The planetary gear set 140 includes a sun gear member 142, a ring gear member 144, and a planet carrier assembly member 146. The planet carrier assembly member 146 includes a plurality of pinion gears 147 rotatably mounted on a carrier member 149 and disposed in meshing relationship with both the sun gear member 142 and the ring gear member 144.

The planetary gear arrangement 118 also includes six torque-transmitting mechanisms 150, 152, 154, 156, 158 and 159. The torque-transmitting mechanisms 150, 152, 154, 156 and 158 are rotating-type torque-transmitting mechanisms, commonly termed "clutches." The torque-transmitting mechanism 159 is a stationary-type torque-transmitting mechanism, commonly termed brake or reaction clutch.

The input shaft 17 is not continuously connected with any planetary gear member. The output shaft 19 is continuously connected with the ring gear member 144. The sun gear member 122 is continuously connected with the transmission housing 160. The planet carrier assembly member 126 is continuously connected with the planet carrier assembly member 136 and with the sun gear member 142 through the interconnecting member 170.

The planet carrier assembly member 126 is selectively connectable with the input shaft 17 through the clutch 150. The sun gear member 132 is selectively connectable with the input shaft 17 through the clutch 152. The planet carrier assembly member 146 is selectively connectable with the input shaft 17 through the clutch 154. The ring gear member 124 is selectively connectable with the sun gear member 132 through the clutch 156. The ring gear member 134 is selectively connectable with the planet carrier assembly member 146 through the clutch 158. The ring gear member 134 is selectively connectable with the transmission housing 160 through the brake 159.

The truth table of FIG. 2b describes the engagement sequence utilized to provide seven forward speed ratios and two reverse speed ratios in the planetary gear arrangement 118 shown in FIG. 2a.

The reverse speed ratio (Reverse 1) is established with the engagement of the clutches 150, 158 and the brake 159. The clutch 150 connects the planet carrier assembly member 126 with the input shaft 17. The clutch 158 connects the ring gear member 134 with the planet carrier assembly member 146. The brake 159 connects the ring gear member 134 with the transmission housing 160. The sun gear member 122, the ring gear member 134 and planet carrier assembly member 146 do not rotate. The planet carrier assembly members 126, 136 and the sun gear member 142 rotate at the same speed as the input shaft 17. The ring gear member 144 rotates at the same speed as the output shaft 19. The ring gear member 144, and therefore the output shaft 19, rotates at a speed determined from the speed of the sun gear member 142 and the ring gear/sun gear tooth ratio of the planetary gear set 140. The numerical value of the reverse speed ratio is determined utilizing the ring gear/sun gear tooth ratio of the planetary gear set 140.

The first forward speed ratio is established with the engagement of the clutches 152, 156 and 158. The clutch 152 connects the sun gear member 132 with the input shaft 17. The clutch 156 connects the ring gear member 124 with the sun gear member 132. The clutch 158 connects the ring gear member 134 with the planet carrier assembly member 146. The sun gear member 122 does not rotate. The planet carrier assembly member 126 rotates at the same speed as the planet carrier assembly member 136 and the sun gear member 142. The ring gear member 124 and sun gear member 132 rotate at the same speed as the input shaft 17. The planet carrier assembly member 126 rotates at a speed determined from the speed of the ring gear member 124 and the ring gear/sun gear tooth ratio of the planetary gear set 120. The ring gear member 134 rotates at the same speed as the planet carrier assembly member 146. The planet carrier assembly member 136 rotates at a speed determined from the speed of the ring gear member 134, the speed of the sun gear member 132 and the ring gear/sun gear tooth ratio of the planetary gear set 130. The ring gear member 144 rotates at the same speed as the output shaft 19. The ring gear member 144, and therefore the output shaft 19, rotates at a speed determined from the speed of the planet carrier assembly member 146, the speed of the sun gear member 142 and the ring gear/sun gear tooth ratio of the planetary gear set 140. The numerical value of the first forward speed ratio is determined utilizing the ring gear/sun gear tooth ratios of the planetary gear sets 120, 130 and 140.

The second forward speed ratio is established with the engagement of the clutches 150, 156 and 158. The clutch 150 connects the planet carrier assembly member 126 with the input shaft 17. The clutch 156 connects the ring gear member 124 with the sun gear member 132. The clutch 158 connects the ring gear member 134 with the planet carrier assembly member 146. The sun gear member 122 does not rotate. The planet carrier assembly members 126, 136 and the sun gear member 142 rotate at the same speed as the input shaft 17. The ring gear member 124 rotates at the same speed as the sun gear member 132. The ring gear member 124 rotates at a speed determined from the speed of the planet carrier assembly member 126 and the ring gear/sun gear tooth ratio of the planetary gear set 120. The ring gear member 134 rotates at the same speed as the planet carrier assembly member 146. The ring gear member 134 rotates at a speed determined from the speed of the planet carrier assembly member 136, the speed of the sun gear member 132 and the ring gear/sun gear tooth ratio of the planetary gear set 130. The ring gear member 144 rotates at the same speed as the output shaft 19. The ring gear member 144, and therefore the output shaft 19, rotates at a speed determined from the speed of the planet carrier assembly member 146, the speed of the sun gear member 142 and the ring gear/sun gear tooth ratio of the planetary gear set 140. The numerical value of the second forward speed ratio is determined utilizing the ring gear/sun gear tooth ratios of the planetary gear sets 120, 130 and 140.

The third forward speed ratio is established with the engagement of the clutches 154, 156 and 158. The clutch 154 connects the planet carrier assembly member 146 with the input shaft 17. The clutch 156 connects the ring gear member 124 with the sun gear member 132. The clutch 158 connects the ring gear member 134 with the planet carrier assembly member 146. The sun gear member 122 does not rotate. The planet carrier assembly members 126 and 136 rotate at the same speed as the sun gear member 142. The ring gear member 124 rotates at the same speed as the sun gear member 132. The planet carrier assembly member 126 rotates at a speed determined from the speed of the ring gear member 124 and the ring gear/sun gear tooth ratio of the planetary gear set 120. The ring gear member 134 and planet carrier assembly member 146 rotate at the same speed as the input shaft 17. The planet carrier assembly member 136 rotates at a speed determined from the speed of the ring gear member 134, the speed of the sun gear member 132 and the ring gear/sun gear tooth ratio of the planetary gear set 130. The ring gear member 144 rotates at the same speed as the output shaft 19. The ring gear member 144, and therefore the output shaft 19, rotates at a speed determined from the speed of the planet carrier assembly member 146, the speed of the sun gear member 142 and the ring gear/sun gear tooth ratio of the planetary gear set 140. The numerical value of the third forward speed ratio is determined utilizing the ring gear/sun gear tooth ratios of the planetary gear sets 120, 130 and 140.

The fourth forward speed ratio is established with the engagement of the clutches 150, 154 and 156. In this configuration, the input shaft 17 is directly connected to the output shaft 19. The numerical value of the fourth forward speed ratio is 1.

The fifth forward speed ratio is established with the engagement of the clutches 152, 154 and 156. The clutch 152 connects the sun gear member 132 with the input shaft 17. The clutch 154 connects the planet carrier assembly member 146 with the input shaft 17. The clutch 156 connects the ring gear member 124 with the sun gear member 132. The sun gear member 122 does not rotate. The planet carrier assembly members 126 and 136 rotate at the same speed as the sun gear member 142. The ring gear member 124, sun gear member 132 and planet carrier assembly member 146 rotate at the same speed as the input shaft 17. The planet carrier assembly member 126 rotates at a speed determined from the speed of the ring gear member 124 and the ring gear/sun gear tooth ratio of the planetary gear set 120. The ring gear member 144 rotates at the same speed as the output shaft 19. The ring gear member 144, and therefore the output shaft 19, rotates at a speed determined from the speed of the planet carrier assembly member 146, the speed of the sun gear member 142 and the ring gear/sun gear tooth ratio of the planetary gear set 140. The numerical value of the fifth forward speed ratio is determined utilizing the ring gear/sun gear tooth ratios of the planetary gear sets 120 and 140.

The sixth forward speed ratio is established with the engagement of the clutches 152, 154 and the brake 159. The clutch 152 connects the sun gear member 132 with the input shaft 17. The clutch 154 connects the planet carrier assembly member 146 with the input shaft 17. The brake 159 connects the ring gear member 134 with the transmission housing 160. The sun gear member 122 does not rotate. The planet carrier assembly members 126 and 136 rotate at the same speed as the sun gear member 142. The sun gear member 132 and planet carrier assembly member 146 rotate at the same speed as the input shaft 17. The ring gear member 134 does not rotate. The planet carrier assembly member 136 rotates at a speed determined from the speed of the sun gear member 132 and the ring gear/sun gear tooth ratio of the planetary gear set 130. The ring gear member 144 rotates at the same speed as the output shaft 19. The ring gear member 144, and therefore the output shaft 19, rotates at a speed determined from the speed of the planet carrier assembly member 146, the speed of the sun gear member 142 and the ring gear/sun gear tooth ratio of the planetary gear set 140. The numerical value of the sixth forward speed ratio is determined utilizing the ring gear/sun gear tooth ratios of the planetary gear sets 130 and 140.

The seventh forward speed ratio is established with the engagement of the clutches 154, 156 and the brake 159. The clutch 154 connects the planet carrier assembly member 146 with the input shaft 17. The clutch 156 connects the ring gear member 124 with the sun gear member 132. The brake 159 connects the ring gear member 134 with the transmission housing 160. The sun gear member 122 does not rotate. The planet carrier assembly members 126 and 136 rotate at the same speed as the sun gear member 142. The ring gear member 124 rotates at the same speed as the sun gear member 132. The planet carrier assembly member 126 rotates at a speed determined from the speed of the ring gear member 124 and the ring gear/sun gear tooth ratio of the planetary gear set 120. The ring gear member 134 does not rotate. The planet carrier assembly member 136 rotates at a speed determined from the speed of the sun gear member 132 and the ring gear/sun gear tooth ratio of the planetary gear set 130. The ring gear member 144 rotates at the same speed as the output shaft 19. The ring gear member 144, and therefore the output shaft 19, rotates at a speed determined from the speed of the planet carrier assembly member 146, the speed of the sun gear member 142 and the ring gear/sun gear tooth ratio of the planetary gear set 140. The numerical value of the seventh forward speed ratio is determined utilizing the ring gear/sun gear tooth ratio of the planetary gear set 120, 130 and 140.

As set forth above, the truth table of FIG. 2b describes the engagement sequence of the torque-transmitting mechanisms utilized to provide the two reverse drive ratios and seven forward speed ratios. It can be readily determined from the truth table that all of the single step forward interchanges are of the single transition type, except the reverse-to-first step. The truth table also provides an example of the ratios that can be attained with the family members shown in FIG. 2a utilizing the sample tooth ratios given in FIG. 2b. The R1/S1 value is the tooth ratio of the planetary gear set 120; the R1/S1 value is the tooth ratio of the planetary gear set 130; and the R3/S3 value is the tooth ratio of the planetary gear set 140. Also shown in FIG. 2b are the ratio steps between single step ratios in the forward direction as well as the reverse to first ratio step ratio. For example, the first to second step ratio is 1.61.

Figures 3A, 3B:
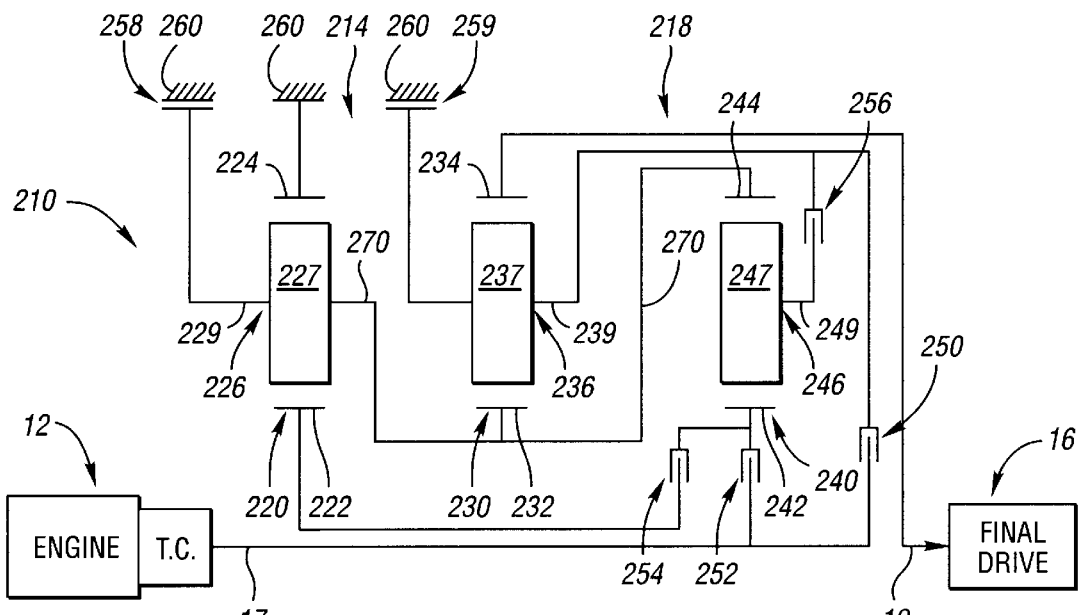

Turning to FIG. 3a, a powertrain 210 includes the engine and torque converter 12, a planetary transmission 214, and a final drive mechanism 16. The planetary transmission 214 includes an input shaft 17 continuously connected with the engine and torque converter 12, a planetary gear arrangement 218, and an output shaft 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly 226. The planet carrier assembly 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of pinion gears 237 rotatably mounted on a carrier member 239 and disposed in meshing relationship with both the sun gear member 232 and the ring gear member 234.

The planetary gear set 240 includes a sun gear member 242, a ring gear member 244, and a planet carrier assembly member 246. The planet carrier assembly member 246 includes a plurality of pinion gears 247 rotatably mounted on a carrier member 249 and disposed in meshing relationship with both the sun gear member 242 and the ring gear member 244.

The planetary gear arrangement 218 also includes six torque-transmitting mechanisms 250, 252, 254, 256, 258 and 259. The torque-transmitting mechanisms 250, 252, 254 and 256 are rotating type torque-transmitting mechanisms, commonly termed clutches. The torque-transmitting mechanisms 258 and 259 are stationary type torque-transmitting mechanisms, commonly termed brakes or reaction clutches.

The input shaft 17 is not continuously connected with any planetary gear member. The output shaft 19 is continuously connected with the ring gear member 234. The ring gear member 224 is continuously connected with the transmission housing 260. The planet carrier assembly member 226 is continuously connected with the sun gear member 232 and the ring gear member 244 through the interconnecting member 270.

The planet carrier assembly member 236 is selectively connectable with the input shaft 17 through the clutch 250. The sun gear member 242 is selectively connectable with the input shaft 17 through the clutch 252. The sun gear member 222 is selectively connectable with the sun gear member 242 through the clutch 254. The planet carrier assembly member 236 is selectively connectable with the planet carrier assembly member 246 through the clutch 256. The planet carrier assembly member 226 is selectively connectable with the transmission housing 260 through the brake 258. The planet carrier assembly member 236 is selectively connectable with the transmission housing 260 through the brake 259.

As shown in the truth table in FIG. 3b, the torque-transmitting mechanisms are engaged in combinations of three to establish seven forward speed ratios and one reverse ratio.

The reverse speed ratio is established with the engagement of the clutches 252, 254 and the brake 259. The clutch 252 connects the sun gear member 242 with the input shaft 17. The clutch 254 connects the sun gear member 222 with the sun gear member 242. The brake 259 connects the planet carrier assembly member 236 with the transmission housing 260. The ring gear member 224 does not rotate. The planet carrier assembly member 226 rotates at the same speed as the sun gear member 232 and the ring gear member 244. The sun gear members 222 and 242 rotate at the same speed as the input shaft 17. The planet carrier assembly member 226 rotates at a speed determined from the speed of the sun gear member 222 and the ring gear/sun gear tooth ratio of the planetary gear set 220. The planet carrier assembly member 236 does not rotate. The ring gear member 234 rotates at the same speed as the output shaft 19. The ring gear member 234, and therefore the output shaft 19, rotates at a speed determined from the speed of the sun gear member 232 and the ring gear/sun gear tooth ratio of the planetary gear set 230. The numerical value of the reverse speed ratio is determined utilizing the ring gear/sun gear tooth ratios of the planetary gear sets 220 and 230.

The first forward speed ratio is established with the engagement of the clutches 252, 256 and the brake 259. The clutch 252 connects the sun gear member 242 with the input shaft 17. The clutch 256 connects the planet carrier assembly member 236 with the planet carrier assembly member 246. The brake 259 connects the planet carrier assembly member 236 with the transmission housing 260. The ring gear member 224, planet carrier assembly member 236, and planet carrier assembly member 246 do not rotate. The planet carrier assembly member 226 rotates at the sane speed as the sun gear member 232 and the ring gear member 244. The ring gear member 234 rotates at the same speed as the output shaft 19. The ring gear member 234, and therefore the output shaft 19, rotates at a speed determined from the speed of the sun gear member 232 and the ring gear/sun gear tooth ratio of the planetary gear set 230. The sun gear member 242 rotates at the same speed as the input shaft 17.

The ring gear member 244 rotates at a speed determined from the speed of the sun gear member 242 and the ring gear/sun gear tooth ratio of the planetary gear set 240. The numerical value of the first forward speed ratio is determined utilizing the ring gear/sun gear tooth ratios of the planetary gear sets 230 and 240.

The second forward speed ratio is established with the engagement of the clutches 252, 256 and the brake 258. The clutch 252 connects the sun gear member 242 with the input shaft 17. The clutch 256 connects the planet carrier assembly member 236 with the planet carrier assembly member 246. The brake 258 connects the planet carrier assembly member 226 with the transmission housing 260. The planetary gear set 220, sun gear member 232 and ring gear member 244 do not rotate. The planet carrier assembly member 236 rotates at the same speed as the planet carrier assembly member 246. The ring gear member 234 rotates at the same speed as the output shaft 19. The ring gear member 234, and therefore the output shaft 19, rotates at a speed determined from the speed of the planet carrier assembly member 236 and the ring gear/sun gear tooth ratio of the planetary gear set 230. The sun gear member 242 rotates at the same speed as the input shaft 17. The planet carrier assembly member 246 rotates at a speed determined from the speed of the sun gear member 242 and the ring gear/sun gear tooth ratio of the planetary gear set 240. The numerical value of the second forward speed ratio is determined utilizing the ring gear/sun gear tooth ratios of the planetary gear sets 230 and 240.

The third forward speed ratio is established with the engagement of the clutches 252, 254 and 256. The clutch 252 connects the sun gear member 242 with the input shaft 17. The clutch 254 connects the sun gear member 222 with the sun gear member 242. The clutch 256 connects the planet carrier assembly member 236 with the planet carrier assembly member 246. The ring gear member 224 does not rotate. The planet carrier assembly member 226 rotates at the same speed as the sun gear member 232 and the ring gear member 244. The sun gear members 222 and 242 rotate at the same speed as the input shaft 17. The planet carrier assembly member 226 rotates at a speed determined from the speed of the sun gear member 222 and the ring gear/sun gear tooth ratio of the planetary gear set 220. The ring gear member 234 rotates at the same speed as the output shaft 19. The planet carrier assembly member 236 rotates at the same speed as the planet carrier assembly member 246. The ring gear member 234, and therefore the output shaft 19, rotates at a speed determined from the speed of the planet carrier assembly member 236, the speed of the sun gear member 232 and the ring gear/sun gear tooth ratio of the planetary gear set 230. The planet carrier assembly member 246 rotates at a speed determined from the speed of the ring gear member 244, the speed of the sun gear member 242 and the ring gear/sun gear tooth ratio of the planetary gear set 240. The numerical value of the third forward speed ratio is determined utilizing the ring gear/sun gear tooth ratios of the planetary gear sets 220, 230 and 240.

The fourth forward speed ratio is established with the engagement of the clutches 250, 252 and 256. In this configuration, the input shaft 17 is directly connected to the output shaft 19. The numerical value of the fourth forward speed ratio is 1.

The fifth forward speed ratio is established with the engagement of the clutches 250, 254 and 256. The clutch 250 connects the planet carrier assembly member 236 with the input shaft 17. The clutch 254 connects the sun gear member 222 with the sun gear member 242. The clutch 256 connects the planet carrier assembly member 236 with the planet carrier assembly member 246. The ring gear member 224 does not rotate. The planet carrier assembly member 226 rotates at the same speed as the sun gear member 232 and the ring gear member 244. The sun gear member 222 rotates at the same speed as the sun gear member 242. The planet carrier assembly member 226 rotates at a speed determined from the speed of the sun gear member 222 and the ring gear/sun gear tooth ratio of the planetary gear set 220. The ring gear member 234 rotates at the same speed as the output shaft 19. The planet carrier assembly members 236 and 246 rotate at the same speed as the input shaft 17. The ring gear member 234, and therefore the output shaft 19, rotates at a speed determined from the speed of the planet carrier assembly member 236, the speed of the sun gear member 232 and the ring gear/sun gear tooth ratio of the planetary gear set 230. The planet carrier assembly member 246 rotates at a speed determined from the speed of the ring gear member 244, the speed of the sun gear member 242 and the ring gear/sun gear tooth ratio of the planetary gear set 240. The numerical value of the fifth forward speed ratio is determined utilizing the ring gear/sun gear tooth ratios of the planetary gear sets 220, 230 and 240.

The sixth forward speed ratio is established with the engagement of the clutches 250, 252 and 254. The clutch 250 connects the planet carrier assembly member 236 with the input shaft 17. The clutch 252 connects the sun gear member 242 with the input shaft 17. The clutch 254 connects the sun gear member 222 with the sun gear member 242. The ring gear member 224 does not rotate. The planet carrier assembly member 226 rotates at the same speed as the sun gear member 232 and the ring gear member 244. The sun gear members 222, 242 and the planet carrier assembly member 236 rotate at the same speed as the input shaft 17. The planet carrier assembly member 226 rotates at a speed determined from the speed of the sun gear member 222 and the ring gear/sun gear tooth ratio of the planetary gear set 220. The ring gear member 234 rotates at the same speed as the output shaft 19. The ring gear member 234, and therefore the output shaft 19, rotates at a speed determined from the speed of the planet carrier assembly member 236, the speed of the sun gear member 232 and the ring gear/sun gear tooth ratio of the planetary gear set 230. The numerical value of the sixth forward speed ratio is determined utilizing the ring gear/sun gear tooth ratios of the planetary gear sets 220 and 230.

The seventh forward speed ratio is established with the engagement of the clutch 250, 252 and the brake 258. The clutch 250 connects the planet carrier assembly member 236 with the input shaft 17. The clutch 252 connects the sun gear member 242 with the input shaft 17. The brake 258 connects the planet carrier assembly member 226 with the transmission housing 260. The planetary gear set 220, sun gear member 232 and ring gear member 244 do not rotate. The ring gear member 234 rotates at the same speed as the output shaft 19. The planet carrier assembly member 236 and sun gear member 242 rotate at the same speed as the input shaft 17. The ring gear member 234, and therefore the output shaft 19, rotates at a speed determined from the speed of the planet carrier assembly member 236 and the ring gear/sun gear tooth ratio of the planetary gear set 230. The numerical value of the seventh forward speed ratio is determined utilizing the ring gear/sun gear tooth ratio of the planetary gear set 230.

As previously set forth, the truth table of FIG. 3b describes the combinations of engagements utilized for the seven forward speed ratios and reverse ratio. The truth table also provides an example of speed ratios that are available with the family member described above. These examples of speed ratios are determined utilizing the tooth ratios given in FIG. 3b. The R1/S1 value is the tooth ratio of the planetary gear set 220; the R2/S2 value is the tooth ratio of the planetary gear set 230; and the R3/S3 value is the tooth ratio of the planetary gear set 240. Also depicted in FIG. 3b is a chart representing the ratio steps between adjacent forward speed ratios and the reverse speed ratio. For example, the first to second ratio interchange has a step of 1.88. It can also be readily determined from the truth table of FIG. 3b that all of the single step forward ratio interchanges are of the single transition variety.

Figures 4A, 4B:
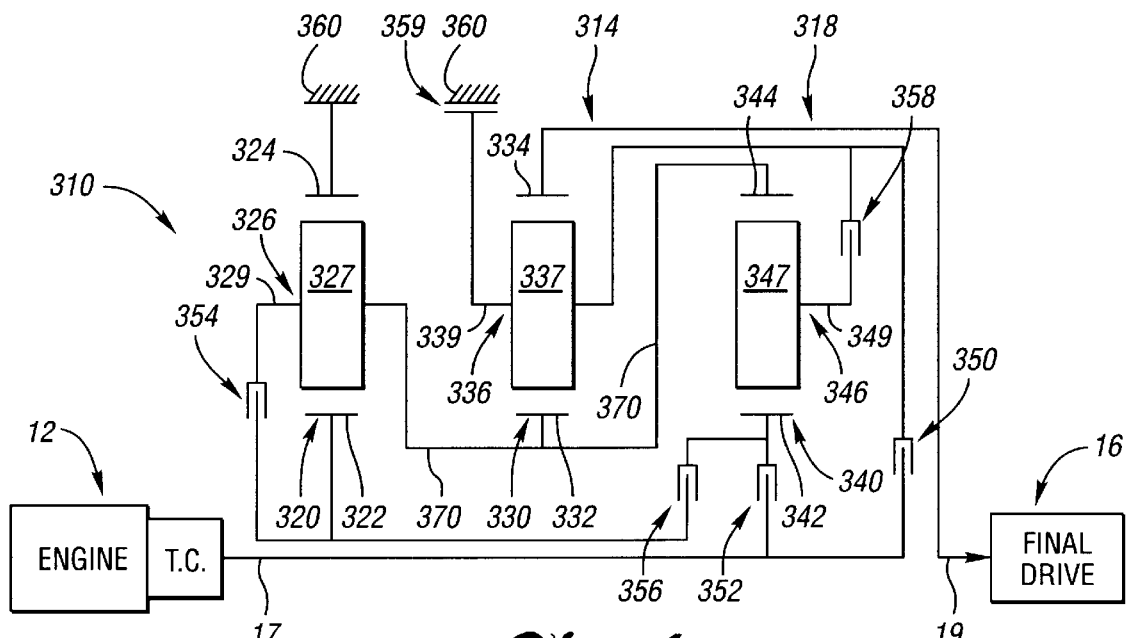

A powertrain 310, shown in FIG. 4a, includes the engine and torque converter 12, a planetary transmission 314, and the final drive mechanism 16. The planetary transmission 314 includes an input shaft 17 continuously connected with the engine and torque converter 12, a planetary gear arrangement 318, and output shaft 19 continuously connected with the final drive mechanism 16. The planetary gear arrangement 318 includes three planetary gear sets 320, 330 and 340.

The planetary gear set 320 includes a sun gear member 322, a ring gear member 324, and a planet carrier assembly member 326. The planet carrier assembly member 326 includes a plurality of pinion gears 327 rotatably mounted on a carrier member 329 and disposed in meshing relationship with both the sun gear member 322 and the ring gear member 324.

The planetary gear set 330 includes a sun gear member 332, a ring gear member 334, and a planet carrier assembly member 336. The planet carrier assembly member 336 includes a plurality of pinion gears 337 rotatably mounted on a carrier member 339 and disposed in meshing relationship with both the sun gear member 332 and the ring gear member 334.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

The planetary gear arrangement 318 also includes six torque-transmitting mechanisms 350, 352, 354, 356, 358 and 359. The torque-transmitting mechanisms 350, 352, 354, 356 and 358 are rotating type torque-transmitting mechanisms, commonly termed clutches. The torque-transmitting mechanism 359 is a stationary type torque-transmitting mechanism, commonly termed brake or reaction clutch.

The input shaft 17 is not continuously connected with any planetary gear member. The output shaft 19 is continuously connected with the ring gear member 334. The ring gear member 324 is continuously connected with the transmission housing 360. The planet carrier assembly member 326 is continuously connected with the sun gear member 332 and the ring gear member 344 through the interconnecting member 370.

The planet carrier assembly member 336 is selectively connectable with the input shaft 17 through the clutch 350. The sun gear member 342 is selectively connectable with the input shaft 17 through the clutch 352. The planet carrier assembly member 326 is selectively connectable with the sun gear member 322 through the clutch 354. The sun gear member 322 is selectively connectable with the sun gear member 342 through the clutch 356. The planet carrier assembly member 336 is selectively connectable with the planet carrier assembly member 346 through the clutch 358. The planet carrier assembly member 336 is selectively connectable with the transmission housing member 360 through the brake 359.

The truth tables given in FIGS. 4b, 5b, 6b, 7b, 8b and 9b show the engagement sequences for the torque-transmitting mechanisms to provide at least seven forward speed ratios and one reverse speed ratio. As shown and described above for the configuration in FIGS. 1a, 2a and 3a, those skilled in the art will understand from the respective truth tables how the speed ratios are established through the planetary gear sets identified in the written description.

The truth table shown in FIG. 4b describes the engagement combination and the engagement sequence necessary to provide the reverse drive ratio and seven forward speed ratios. A sample of the numerical values for the ratios is also provided in the truth table of FIG. 4b. These values are determined utilizing the ring gear/sun gear tooth ratios also given in FIG. 4b. The R1/S1 value is the tooth ratio for the planetary gear set 320; the R2/S2 value is the tooth ratio for the planetary gear set 330; and the R3/S3 value is the tooth ratio for the planetary gear set 340. Also given in FIG. 4b is a chart describing the step ratios between the adjacent forward speed ratios and the reverse to first forward speed ratio. For example, the first to second forward speed ratio step is 1.88. It can be readily determined from the truth table of FIG. 4b that each of the forward single step ratio interchanges is a single transition shift. The chart also shows that the torque-transmitting mechanisms 352 and 359 can be engaged through the neutral condition to simplify the forward/reverse interchange.

Those skilled in the art will recognize that the numerical value of the reverse and sixth forward speed ratios are determined utilizing the ring gear/sun gear tooth ratios of the planetary gear sets 320 and 330. The numerical values of the first and second forward speed ratios are determined utilizing the ring gear/sun gear tooth ratios of the planetary gear sets 330 and 340. The numerical values of the third and fifth forward speed ratios are determined utilizing the ring gear/sun gear tooth ratios of the planetary gear sets 320, 330 and 340. The numerical value of the fourth forward speed ratio is 1. The numerical value of the seventh forward speed ratio is determined utilizing the ring gear/sun gear tooth ratio of the planetary gear set 330.

Figures 5A, 5B:
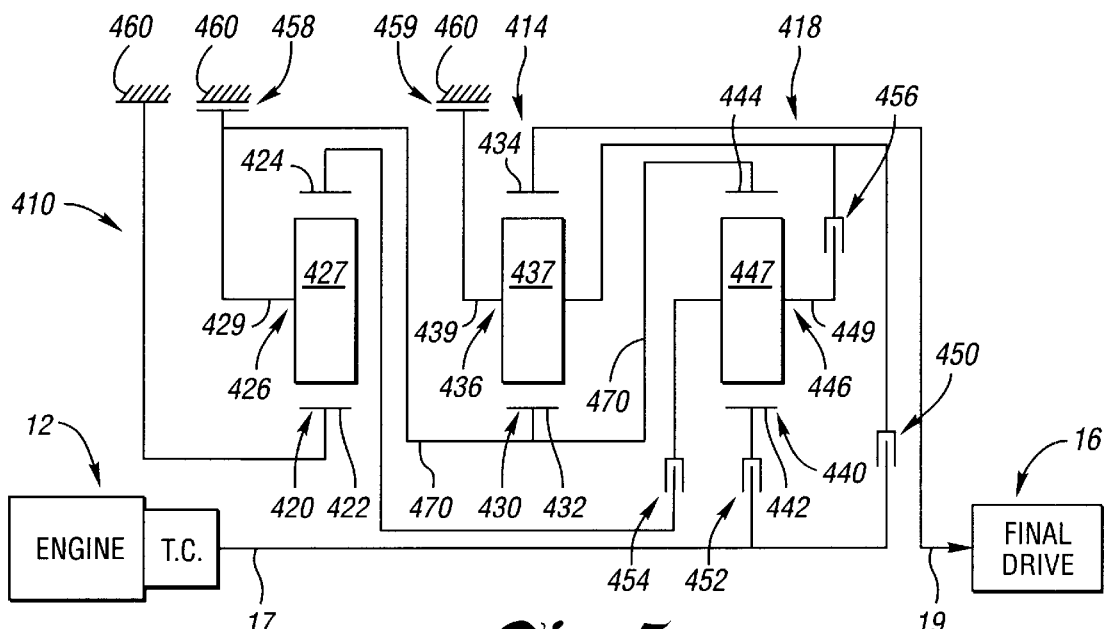

A powertrain 410, shown in FIG. 5a, includes the engine and torque converter 12, a planetary transmission 414 and the final drive mechanism 16. The planetary transmission 414 includes a planetary gear arrangement 418, input shaft 17 and output shaft 19. The planetary gear arrangement 418 includes three simple planetary gear sets 420, 430 and 440.

The planetary gear set 420 includes a sun gear member 422, a ring gear member 424, and a planet carrier assembly 426. The planet carrier assembly 426 includes a plurality of pinion gears 427 rotatably mounted on a carrier member 429 and disposed in meshing relationship with both the sun gear member 422 and the ring gear member 424.

The planetary gear set 430 includes a sun gear member 432, a ring gear member 434, and a planet carrier assembly member 436. The planet carrier assembly member 436 includes a plurality of pinion gears 437 rotatably mounted on a carrier member 439 and disposed in meshing relationship with both the sun gear member 432 and the ring gear member 434.

The planetary gear set 440 includes a sun gear member 442, a ring gear member 444, and a planet carrier assembly member 446. The planet carrier assembly member 446 includes a plurality of pinion gears 447 rotatably mounted on a carrier member 449 and disposed in meshing relationship with both the sun gear member 442 and the ring gear member 444.

The planetary gear arrangement 418 also includes six torque-transmitting mechanisms 450, 452, 454, 456, 458 and 459. The torque-transmitting mechanisms 450, 452, 454 and 456 are rotating-type torque-transmitting mechanisms, commonly termed clutches. The torque-transmitting mechanisms 458 and 459 are stationary-type torque-transmitting mechanisms, commonly termed brakes or reaction clutches.

The input shaft 17 is not continuously connected with any planetary gear member. The output shaft 19 is continuously connected with the ring gear member 434. The sun gear member 422 is continuously connected with the transmission housing 460. The planet carrier assembly member 426 is continuously connected with the sun gear member 432 and ring gear member 444 through the interconnecting member 470.

The planet carrier assembly member 436 is selectively connectable with the input shaft 17 through the clutch 450. The sun gear member 442 is selectively connectable with the input shaft 17 through the clutch 452. The ring gear member 424 is selectively connectable with the planet carrier assembly member 446 through the clutch 454. The planet carrier assembly member 436 is selectively connectable with the planet carrier assembly member 446 through clutch 456. The planet carrier assembly member 426 is selectively connectable with the transmission housing 460 through the brake 458. The planet carrier assembly member 436 is selectively connectable with the transmission housing 460 through the brake 459.

The truth table shown in FIG. 5b describes the engagement combination and sequence of the torque-transmitting mechanisms 450, 452, 454, 456, 458 and 459 that are employed to provide the reverse drive ratio and the seven forward speed ratios. It should be noted that the torque-transmitting mechanisms 452 and 459 are engaged through the neutral condition to simplify the forward/reverse interchange.

Also given in the truth table of FIG. 5b is a set of numerical values that are attainable with the present invention utilizing the ring gear/sun gear tooth ratios shown. The R1/S1 value is the tooth ratio of the planetary gear set 420; the R2/S2 value is the tooth ratio of the planetary gear set 430; and the R3/S3 value is the tooth ratio of the planetary gear set 440.

FIG. 5b also provides a chart of the ratio steps between adjacent forward ratios and between the reverse and first forward ratio. For example, the ratio step between the first and second forward ratios is 1.88. Those skilled in the art will recognize that the numerical values of the reverse, third and sixth forward speed ratios are determined utilizing the ring gear/sun gear tooth ratios of the planetary gear sets 420, 430 and 440. The numerical values of the first and second forward speed ratios are determined utilizing the ring gear/sun gear tooth ratios of the planetary gear sets 430 and 440. The numerical value of the fourth forward speed ratio is 1. The numerical value of the fifth forward speed ratio is determined utilizing the ring gear/sun gear tooth ratios of the planetary gear sets 420 and 430. The numerical value of the seventh forward speed ratio is determined utilizing the ring gear/sun gear tooth ratios of the planetary gear sets 430.

Figures 6A, 6B:
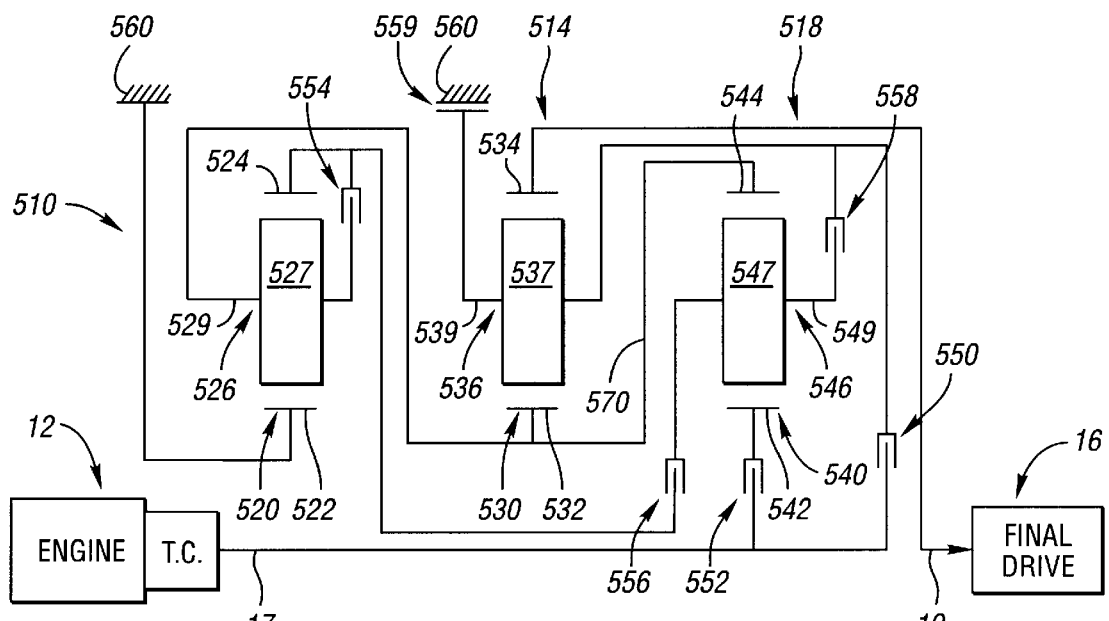

A powertrain 510, shown in FIG. 6a, includes an engine and torque converter 12, a planetary gear transmission 514 and the final drive mechanism 16. The planetary transmission 514 includes the input shaft 17, a planetary gear arrangement 518 and the output shaft 19. The planetary gear arrangement 518 includes three planetary gear sets 520, 530 and 540.

The planetary gear set 520 includes a sun gear member 522, a ring gear member 524, and a planet carrier assembly 526. The planet carrier assembly 526 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the sun gear member 532 and the ring gear member 534.

The planetary gear set 540 includes a sun gear member 542, a ring gear member 544, and a planet carrier assembly member 546. The planet carrier assembly member 546 includes a plurality of pinion gears 547 rotatably mounted on a carrier member 549 and disposed in meshing relationship with both the sun gear member 542 and the ring gear member 544.

The planetary gear arrangement 518 also includes six torque-transmitting mechanisms 550, 552, 554, 556, 558 and 559. The torque-transmitting mechanisms 550, 552, 554, 556 and 558 are rotating-type torque-transmitting mechanisms, commonly termed clutches. The torque-transmitting mechanism 559 is a stationary-type torque-transmitting mechanism, commonly termed brake or reaction clutch.

The input shaft 17 is not continuously connected with any planetary gear member. The output shaft 19 is continuously connected with the ring gear member 534. The sun gear member 522 is continuously connected with the transmission housing 560. The planet carrier assembly member 526 is continuously connected with the sun gear member 532 and the ring gear member 544 through the interconnecting member 570.

The planet carrier assembly member 536 is selectively connectable with the input shaft 17 through the clutch 550. The sun gear member 542 is selectively connectable with the input shaft 17 through the clutch 552. The ring gear member 524 is selectively connectable with the planet carrier assembly member 526 through the clutch 554. The ring gear member 524 is selectively connectable with the planet carrier assembly member 546 through the clutch 556. The planet carrier assembly member 536 is selectively connectable with the planet carrier assembly member 546 through the clutch 558. The planet carrier assembly member 536 is selectively connectable with the transmission housing 560 through the brake 559.

The truth table shown in FIG. 6b describes the engagement sequence and combination of the torque-transmitting mechanisms to provide the reverse speed ratio and seven forward speed ratios. It should be noted that the torque-transmitting mechanisms 552 and 559 can remain engaged through the neutral condition, thereby simplifying the forward/reverse interchange. It can also be determined from the truth table of FIG. 6b that all of the single step forward ratio interchanges are of the single transition variety. The chart of FIG. 6b describes the ratio steps between adjacent forward speed ratios and the ratio step between the reverse and first forward speed ratio.

Those skilled in the art, upon reviewing the truth table and the schematic representation of FIG. 6a, can determine that the numerical values of the reverse, third and sixth forward speed ratios are determined utilizing the ring gear/sun gear tooth ratios of the planetary gear sets 520, 530 and 540. The numerical values of the first and second forward speed ratios are determined utilizing the ring gear/sun gear tooth ratios of the planetary gear sets 530 and 540. The numerical value of the fourth forward speed ratio is 1. The numerical value of the fifth forward speed ratio is determined utilizing the ring gear/sun gear tooth ratios of the planetary gear sets 520 and 530. The numerical value of the seventh forward speed ratio is determined utilizing the ring gear/sun gear tooth ratio of the planetary gear set 530.

The sample speed ratios given in the truth table are determined utilizing the tooth ratio values also given in FIG. 6b. The R1/S1 value is the tooth ratio of the planetary gear set 520; the R2/S2 value is the tooth ratio of the planetary gear set 530; and the R3/S3 value is the tooth ratio of the planetary gear set 540.

Figures 7A, 7B:
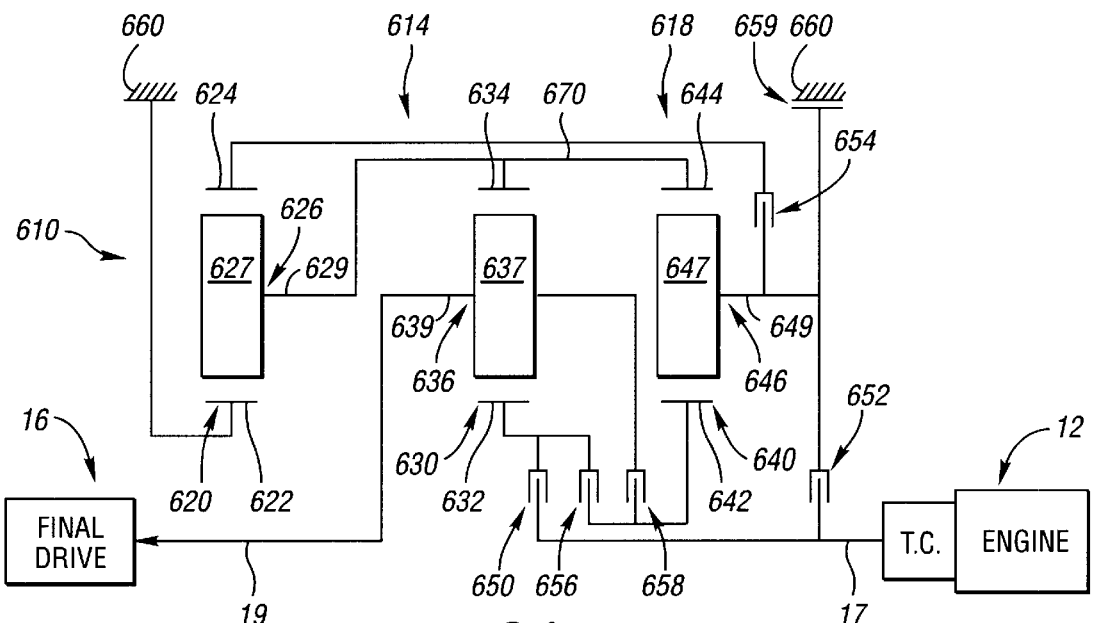

A powertrain 610, shown in FIG. 7a, has the engine and torque converter 12, a planetary transmission 614 and the final drive mechanism 16. The planetary transmission 614 includes the input shaft 17, a planetary gear arrangement 618 and the output shaft 19. The planetary gear arrangement 618 includes three planetary gear sets 620, 630 and 640.

The planetary gear set 620 includes a sun gear member 622, a ring gear member 624, and a planet carrier assembly 626. The planet carrier assembly 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of pinion gears 637 rotatably mounted on a carrier member 639 and disposed in meshing relationship with both the sun gear member 632 and the ring gear member 634.

The planetary gear set 640 includes a sun gear member 642, a ring gear member 644, and a planet carrier assembly member 646. The planet carrier assembly member 646 includes a plurality of pinion gears 647 rotatably mounted on a carrier member 649 and disposed in meshing relationship with both the sun gear member 642 and the ring gear member 644.

The planetary gear arrangement 618 also includes six torque-transmitting mechanisms 650, 652, 654, 656, 658 and 659. The torque-transmitting mechanisms 650, 652, 654, 656 and 658 are rotating-type torque-transmitting mechanisms, commonly termed clutches. The torque transmitting mechanism 659 is a stationary-type torque-transmitting mechanism, commonly termed brake or reaction clutch.

The input shaft 17 is not continuously connected with any planetary gear member. The output shaft 19 is continuously connected with the planet carrier assembly member 636. The sun gear member 622 is continuously connected with the transmission housing 660. The planet carrier assembly member 626 is continuously connected with the ring gear members 634 and 644 through the interconnecting member 670.

The sun gear member 632 is selectively connectable with the input shaft 17 through the clutch 650. The planet carrier assembly member 646 is selectively connectable with the input shaft 17 through the clutch 652. The ring gear member 624 is selectively connectable with the planet carrier assembly member 646 through the clutch 654. The sun gear member 632 is selectively connectable with the sun gear member 642 through the clutch 656. The planet carrier assembly member 636 is selectively connectable with the sun gear member 642 through the clutch 658. The planet carrier assembly member 646 is selectively connectable with the transmission housing 660 through the brake 659.

The truth table shown in FIG. 7b describes the combination of torque-transmitting mechanism engagements that will provide the reverse drive ratio and eight forward speed ratios, as well as the sequence of these engagements and interchanges. The torque-transmitting mechanisms 650 and 659 can be engaged through the neutral condition, thereby simplifying the forward/reverse interchange.

The ratio values given are by way of example and are established utilizing the ring gear/sun gear tooth ratios given in FIG. 7b. For example, the R1/S1 value is the tooth ratio of the planetary gear set 620; the R2/S2 value is the tooth ratio of the planetary gear set 630; and the R3/S3 value is the tooth ratio of the planetary gear set 640. The ratio steps between adjacent forward ratios and the reverse to first ratio are also given in FIG. 7b.

Those skilled in the art will, upon reviewing the truth table of FIG. 7b, recognize that the numerical values of the reverse and first forward speed ratios are determined utilizing the ring gear/sun gear tooth ratios of the planetary gear sets 630 and 640. The numerical value of the second forward speed ratio is determined utilizing the ring gear/sun gear tooth ratio of the planetary gear set 630. The numerical values of the third, fourth and sixth forward speed ratios are determined utilizing the ring gear/sun gear tooth ratios of the planetary gear sets 620, 630 and 640. The numerical value of the fifth forward speed ratio is determined utilizing the ring gear/sun gear tooth ratios of the planetary gear sets 620 and 630. The numerical value of the seventh forward speed ratio is 1. The numerical value of the eighth forward speed ratio is determined utilizing the ring gear/sun gear tooth ratios of the planetary gear sets 620 and 640.

Figures 8A, 8B:
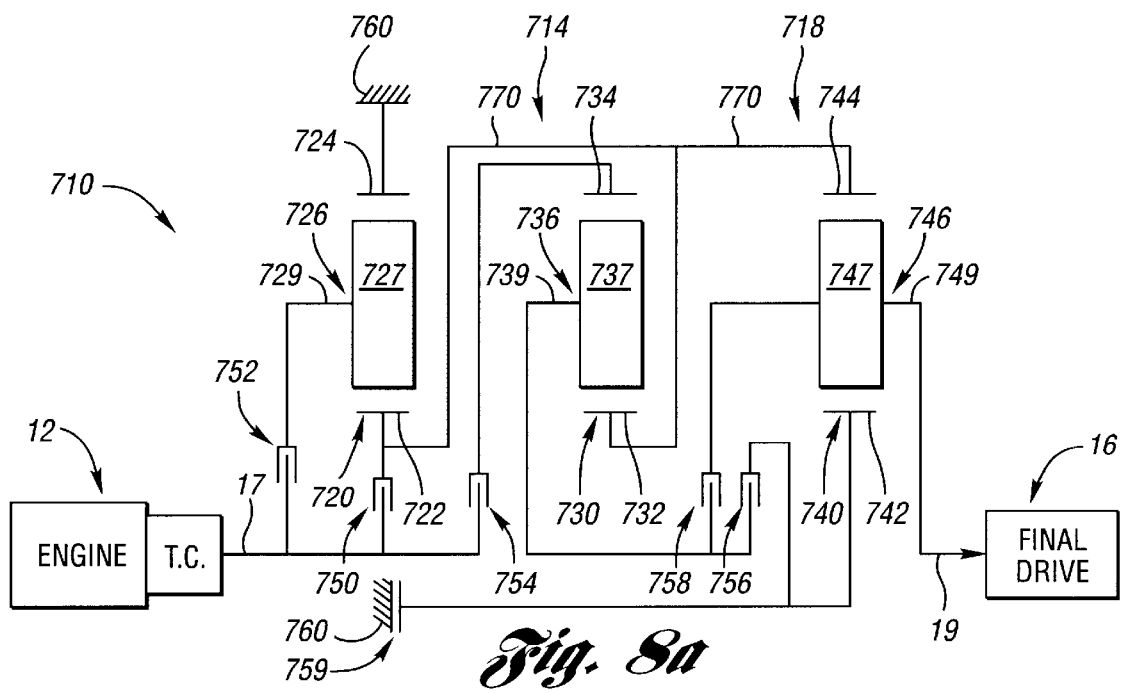

A powertrain 710, shown in FIG. 8a, has the conventional engine and torque converter 12, a planetary transmission 714, and the conventional final drive mechanism 16. The engine and torque converter 12 are drivingly connected with the planetary transmission 714 through the input shaft 17. The planetary transmission 714 is drivingly connected with the final drive mechanism 16 through the output shaft 19. The planetary transmission 714 includes a planetary gear arrangement 718 that has a first planetary gear set 720, a second planetary gear set 730, and a third planetary gear set 740.

The planetary gear set 720 includes a sun gear member 722, a ring gear member 724, and a planet carrier assembly 726. The planet carrier assembly 726 includes a plurality of pinion gears 727 rotatably mounted on a carrier member 729 and disposed in meshing relationship with both the sun gear member 722 and the ring gear member 724.

The planetary gear set 730 includes a sun gear member 732, a ring gear member 734, and a planet carrier assembly member 736. The planet carrier assembly member 736 includes a plurality of pinion gears 737 rotatably mounted on a carrier member 739 and disposed in meshing relationship with both the sun gear member 732 and the ring gear member 734.

The planetary gear set 740 includes a sun gear member 742, a ring gear member 744, and a planet carrier assembly member 746. The planet carrier assembly member 746 includes a plurality of pinion gears 747 rotatably mounted on a carrier member 749 and disposed in meshing relationship with both the sun gear member 742 and the ring gear member 744.

The planetary gear arrangement 718 also includes six torque-transmitting mechanisms 750, 752, 754, 756, 758 and 759. The torque-transmitting mechanisms 750, 752, 754, 756 and 758 are rotating-type torque-transmitting mechanisms, commonly termed clutches. The torque-transmitting mechanism 759 is a stationary-type torque transmitting mechanism, commonly termed brake or reaction clutch.

The input shaft 17 is not continuously connected with any planetary gear member. The output shaft 19 is continuously connected with the planet carrier assembly member 746. The ring gear member 724 is continuously connected with the transmission housing 760. The sun gear member 722 is continuously connected with the sun gear member 732 and the ring gear member 744 through the interconnecting member 770.

The sun gear member 722 is selectively connectable with the input shaft 17 through the clutch 750. The planet carrier assembly member 726 is selectively connectable with the input shaft 17 through the clutch 752. The ring gear member 734 is selectively connectable with the input shaft 17 through the clutch 754. The planet carrier assembly member 736 is selectively connectable with the sun gear member 742 through clutch 756. The planet carrier assembly member 736 is selectively connectable with the planet carrier assembly member 746 through the clutch 758. The sun gear member 742 is selectively connectable with the transmission housing 760 through the brake 759.

The truth table of FIG. 8b defines the torque-transmitting mechanism engagement sequence utilized for each of the forward speed ratios and the reverse speed ratio. Also given in the truth table is a set of numerical values that are attainable with the present invention utilizing the ring gear/sun gear tooth ratios given in FIG. 8b. The R1/S1 value is the tooth ratio of the planetary gear set 720; the R2/S2 value is the tooth ratio of the planetary gear set 730; and the R3/S3 value is the tooth ratio of the planetary gear set 740.

FIG. 8b also provides a chart of the ratio steps between adjacent forward ratios and between the reverse and first forward ratio. For example, the ratio step between the first and second forward ratios is 1.44. Those skilled in the art will recognize that the numerical values of the reverse and third forward speed ratios are determined utilizing the ring gear/sun gear tooth ratios of the planetary gear sets 730 and 740. The numerical value of the first forward speed ratio is determined utilizing the ring gear/sun gear tooth ratio of the planetary gear set 740. The numerical value of the second forward speed ratio is 1. The numerical value of the fourth forward speed ratio is determined utilizing the ring gear/sun gear tooth ratios of the planetary gear sets 720 and 730. The numerical value of the fifth forward speed ratio is determined utilizing the ring gear/sun gear tooth ratios of the planetary gear sets 720 and 740. The numerical value of the sixth forward speed ratio is determined utilizing the ring gear/sun gear tooth ratios of the planetary gear sets 720, 730 and 740. The numerical value of the seventh forward speed ratio is determined utilizing the ring gear/sun gear tooth ratio of the planetary gear set 720.

Figures 9A, 9B:
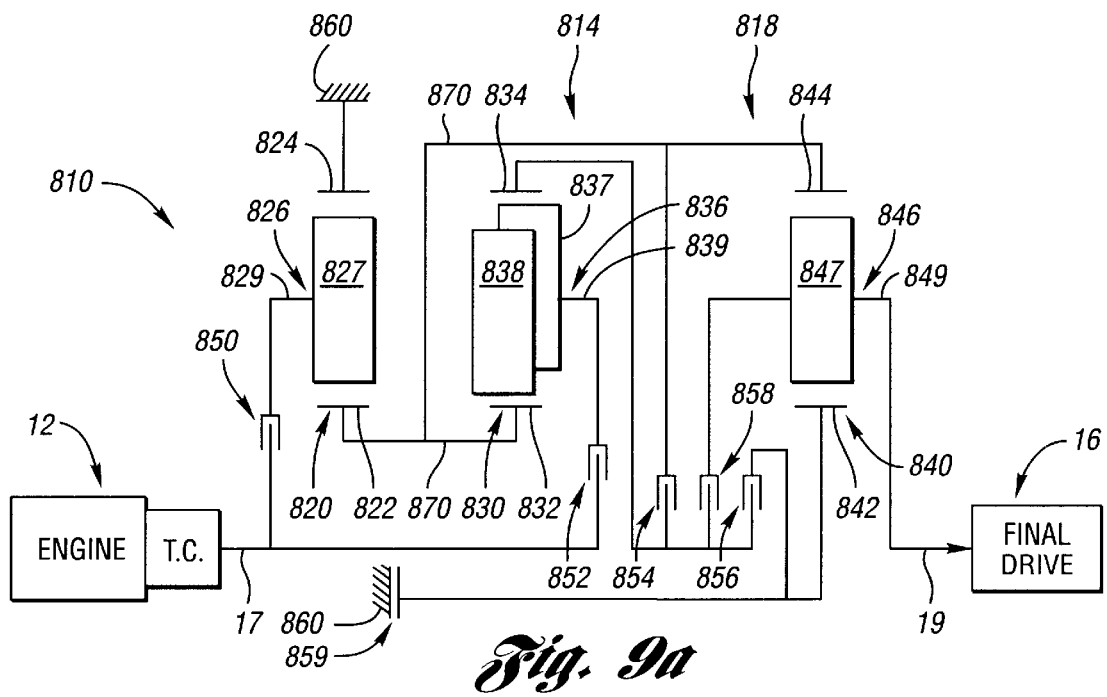

A powertrain 810, shown in FIG. 9a, has the conventional engine and torque converter 12, a planetary transmission 814, and the final drive mechanism 16. The engine and torque converter 12 are drivingly connected with the planetary transmission 814 through the input shaft 17. The planetary transmission 814 is drivingly connected with the final drive mechanism 16 through the output shaft 19. The planetary transmission 814 includes a planetary gear arrangement 818 that has a first planetary gear set 820, a second planetary gear set 830, and a third planetary gear set 840.

The planetary gear set 820 includes a sun gear member 822, a ring gear member 824, and a planet carrier assembly 826. The planet carrier assembly 826 includes a plurality of pinion gears 827 rotatably mounted on a carrier member 829 and disposed in meshing relationship with both the sun gear member 822 and the ring gear member 824.

The planetary gear set 830 includes a sun gear member 832, a ring gear member 834, and a planet carrier assembly member 836. The planet carrier assembly member 836 includes a plurality of pinion gears 837 and 838 rotatably mounted on a carrier member 839 and disposed in meshing relationship with both the sun gear member 832 and the ring gear member 834.

The planetary gear set 840 includes a sun gear member 842, a ring gear member 844, and a planet carrier assembly member 846. The planet carrier assembly member 846 includes a plurality of pinion gears 847 rotatably mounted on a carrier member 849 and disposed in meshing relationship with both the sun gear member 842 and the ring gear member 844.

The planetary gear arrangement 818 also includes six torque-transmitting mechanisms 850, 852, 854, 856, 858 and 859. The torque-transmitting mechanisms 850, 852, 854, 856 and 858 are of the rotating-type torque-transmitting mechanisms, commonly termed clutches. The torque-transmitting mechanism 859 is a stationary-type torque-transmitting mechanism, commonly termed brake or reaction clutch.

The input shaft 17 is not continuously connected with any planetary gear member. The output shaft 19 is continuously connected with the planet carrier assembly member 846. The ring gear member 824 is continuously connected with the transmission housing 860. The sun gear member 822 is continuously connected with the sun gear member 832 and the ring gear member 844 through the interconnecting member 870.

The planet carrier assembly member 826 is selectively connectable with the input shaft 17 through the clutch 850. The planet carrier assembly member 836 is selectively connectable with the input shaft 17 through the clutch 852. The ring gear member 844 is selectively connectable with the ring gear member 834 through the clutch 854. The ring gear member 834 is selectively connectable with the sun gear member 842 through the clutch 856. The ring gear member 834 is selectively connectable with the planet carrier assembly member 846 through the clutch 858. The sun gear member 842 is selectively connectable with the transmission housing 860 through the brake 859.

The truth table shown in FIG. 9b defines the torque-transmitting mechanism engagement sequence that provides the reverse ratio and seven forward speed ratios shown in the truth table and available with the planetary gear arrangement 818. The truth table indicates that the torque-transmitting mechanisms 852 and 859 can remain engaged through the neutral condition, thereby simplifying the forward/reverse interchange. A sample of numerical values for the individual ratios is also given in the truth table of FIG. 9b. These numerical values have been calculated using the ring gear/sun gear tooth ratios also given by way of example in FIG. 9b. The R1/S1 value is the tooth ratio of the planetary gear set 820; the R2/S2 value is the tooth ratio of the planetary gear set 830; and the R3/S3 value is the tooth ratio of the planetary gear set 840. It can be readily recognized from the truth table that all of the single step forward interchanges are single transition ratio interchanges. FIG. 9b also describes the ratio steps between adjacent forward ratios and between the reverse and first forward ratio. For example, the ratio step between the first and second forward ratios is 1.44.

Those skilled in the art of planetary transmissions will recognize that the numerical values of the reverse and third forward speed ratios are determined utilizing the ring gear/sun gear tooth ratios of the planetary gear sets 830 and 840. The numerical value of the first forward speed ratio is determined utilizing the ring gear/sun gear tooth ratio of the planetary gear set 840. The numerical value of the second forward speed ratio is 1. The numerical value of the fourth forward speed ratio is determined utilizing the ring gear/sun gear tooth ratios of the planetary gear sets 820 and 830. The numerical value of the fifth forward speed ratio is determined utilizing the ring gear/sun gear tooth ratios of the planetary gear sets 820 and 840. The numerical value of the sixth forward speed ratio is determined utilizing the ring gear/sun gear tooth ratios of the planetary gear sets 820, 830 and 840. The numerical value of the seventh forward speed ratio is determined utilizing the ring gear/sun gear tooth ratio of the planetary gear set 820.

While the best modes for carrying out the invention have been described in detail, those familiar with the art to which this invention relates will recognize various alternative designs and embodiments for practicing the invention within the scope of the appended claims.

What is claimed is:

1. A multi-speed transmission comprising:
   an input shaft;
   an output shaft;
   first, second and third planetary gear sets each having first, second and third members;
   said output shaft being continuously interconnected with a member of said planetary gear sets;
   an interconnecting member continuously interconnecting said first member of said first planetary gear set with said first member of said second planetary gear set and said first member of said third planetary gear set;
   said second member of said first planetary gear set being continuously interconnected with a stationary member;
   a first torque-transmitting mechanism selectively interconnecting said input shaft with a member of said second planetary gear set;
   a second torque-transmitting mechanism selectively interconnecting said input shaft with a member of said third planetary gear set;
   a third torque-transmitting mechanism selectively interconnecting a member of said first planetary gear set with said input shaft, or a member of said third planetary gear set;
   a fourth torque-transmitting mechanism selectively interconnecting a member of said second planetary gear set with a member of said third planetary gear set;
   a fifth torque-transmitting mechanism selectively interconnecting a member of said second planetary gear set with said stationary member, said member interconnected by said fifth torque-transmitting mechanism being different from the member interconnected with the output shaft;
   a sixth torque-transmitting mechanism selectively interconnecting a member of said third planetary gear set with a member of said first or second planetary gear set, or with said stationary member, the pair of members interconnected by said sixth torque-transmitting mechanism being different from the member interconnected with said input shaft by said third torque-transmitting mechanism and from the pairs of members interconnected by said third and fourth torque-transmitting mechanisms, respectively; and
   said torque-transmitting mechanisms being engaged in combinations of three to establish at least seven forward speed ratios and a reverse speed ratio between said input shaft and said output shaft.

2. The transmission defined in claim 1, wherein said first, second, third and fourth torque-transmitting mechanisms comprise clutches, and said fifth and sixth torque-transmitting mechanisms comprise brakes.

3. The transmission defined in claim 1, wherein said first, second, third, fourth and fifth torque-transmitting mechanisms comprise clutches, and said sixth torque-transmitting mechanism comprises a brake.

4. The transmission defined in claim 1, wherein planet carrier assembly members of each of said planetary gear sets are single-pinion carriers.

5. The transmission defined in claim 1, wherein at least one planet carrier assembly member of said planetary gear sets is a double-pinion carrier.

6. A multi-speed transmission comprising:
   an input shaft;
   an output shaft;
   a planetary gear arrangement having first, second and third planetary gear sets, each planetary gear set having first, second and third members;
   said output shaft being continuously interconnected with a member of said planetary gear sets;
   an interconnecting member continuously interconnecting said first member of said first planetary gear set with said first member of said second planetary gear set and said first member of said third planetary gear set;
   said second member of said first planetary gear set being continuously interconnected with a stationary member; and
   six torque-transmitting mechanisms for selectively interconnecting said members of said first, second or third planetary gear sets with said input shaft, with said stationary member or in pairs for common rotation, said six torque-transmitting mechanisms being engaged in combinations of three to establish at least seven forward speed ratios and at least one reverse speed ratio between said input shaft and said output shaft.

7. The transmission defined in claim 6, wherein the first of said six torque-transmitting mechanisms is operable for selectively connecting said input shaft with a member of said second planetary gear set.

8. The transmission defined in claim 6, wherein the second of said six torque-transmitting mechanisms is operable for selectively interconnecting said input shaft with a member of said third planetary gear set.

9. The transmission defined in claim 6, wherein the third of said six torque-transmitting mechanisms is operable for selectively interconnecting a member of said first planetary gear set with said input shaft or a member of said third planetary gear set.

10. The transmission defined in claim 6, wherein the fourth of said six torque-transmitting mechanisms is operable for selectively interconnecting a member of said second planetary gear set with a member of said third planetary gear set.

11. The transmission defined in claim 6, wherein the fifth of said six torque-transmitting mechanisms is operable for selectively interconnecting a member of said second planetary gear set with said stationary member, said member interconnected by said fifth torque-transmitting mechanism being different from said member interconnected with said output shaft.

12. The transmission defined in claim 6, wherein the sixth of said six torque-transmitting mechanisms is operable for selectively interconnecting a member of said third planetary gear set with a member of said first or second planetary gear set or with said stationary member, the pair of members interconnected by said sixth torque-transmitting mechanism being different from the member interconnected with said input shaft by said third torque-transmitting mechanism, and from the pairs of members interconnected by said third and fourth torque-transmitting mechanisms, respectively.

13. The transmission in claim 6, wherein planet carrier assembly members of each of said planetary gear sets are single-pinion carriers.

14. The transmission in claim 6, wherein at least one planet carrier assembly member of said planetary gear sets is a double-pinion carrier.

* * * * *